United States Patent
Ishikawa et al.

(10) Patent No.: US 11,476,475 B2
(45) Date of Patent: Oct. 18, 2022

(54) FUEL CELL SYSTEM AND CONTROL METHOD THEREFOR

(71) Applicant: TOYOTA JIDOSHA KABUSHIKI KAISHA, Toyota (JP)

(72) Inventors: Tomotaka Ishikawa, Nagoya (JP); Satoshi Watanabe, Okazaki (JP); Kazushi Akamatsu, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/463,682

(22) Filed: Sep. 1, 2021

(65) Prior Publication Data
US 2022/0109168 A1    Apr. 7, 2022

(30) Foreign Application Priority Data
Oct. 7, 2020  (JP) .............................. JP2020-169717

(51) Int. Cl.
*H01M 8/04089* (2016.01)
*H01M 8/04746* (2016.01)

(52) U.S. Cl.
CPC ... *H01M 8/04089* (2013.01); *H01M 8/04761* (2013.01); *H01M 2250/20* (2013.01)

(58) Field of Classification Search
CPC ......... H01M 8/04089; H01M 8/04761; H01M 8/04753
See application file for complete search history.

(56) References Cited

U.S. PATENT DOCUMENTS

| | | | | |
|---|---|---|---|---|
| 2014/0322623 | A1* | 10/2014 | Ohgami | H01M 8/04753 429/427 |
| 2015/0188174 | A1* | 7/2015 | Iwakiri | H01M 8/04225 429/415 |
| 2018/0248208 | A1* | 8/2018 | Aoki | H01M 8/04126 |
| 2018/0366749 | A1* | 12/2018 | Maeshima | H01M 8/04388 |

FOREIGN PATENT DOCUMENTS

JP    2019207802 A    12/2019

* cited by examiner

*Primary Examiner* — Stewart A Fraser
(74) *Attorney, Agent, or Firm* — Dickinson Wright, PLLC

(57) ABSTRACT

A fuel cell system includes fuel cell units each including a fuel cell stack, an anode gas discharge system configured to discharge anode gas from the fuel cell stack, and a cathode gas supply and discharge system configured to supply cathode gas to the fuel cell stack and discharge cathode gas from the fuel cell stack, a mixed gas discharge system configured to mix gas discharged from the anode gas discharge system and the cathode gas supply and discharge system of each fuel cell unit and discharge the mixed gas, and a controller configured to control the fuel cell units. The controller is configured to control at least one of the anode gas discharge system and the cathode gas supply and discharge system of each fuel cell unit to shift a time at which gas to be discharged from each fuel cell unit merges in the mixed gas discharge system.

5 Claims, 8 Drawing Sheets

FUEL CELL SYSTEM AND CONTROL METHOD THEREFOR

CROSS-REFERENCE TO RELATED APPLICATION

This application claims priority to Japanese Patent Application No. 2020-169717 filed on Oct. 7, 2020, incorporated herein by reference in its entirety.

BACKGROUND

1. Technical Field

The disclosure relates to a fuel cell system and a control method therefor.

2. Description of Related Art

A fuel cell system including a plurality of fuel cell stacks is known. Japanese Unexamined Patent Application Publication No. 2019-207802 (JP 2019-207802 A) describes a technology to collectively discharge gas discharged from a plurality of fuel cell stacks.

SUMMARY

Gas discharged from a fuel cell stack may contain unreacted hydrogen gas. To dilute unreacted hydrogen gas, cathode off-gas and anode off-gas of a fuel cell stack are mixed and discharged. During power generation of a fuel cell system, anode off-gas is intermittently discharged, and cathode off-gas is constantly discharged. For this reason, when gas discharged from each of a plurality of fuel cell stacks is merged with each other, unreacted hydrogen gas in anode off-gas discharged at a specific time from each of the fuel cell stacks is diluted by cathode off-gas from the plurality of fuel cell stacks. However, when gas is discharged from each of the plurality of fuel cell stacks at the same time, the hydrogen concentration of collectively discharged gas may increase. For this reason, a technology to make it possible to suppress an increase in the hydrogen concentration of gas discharged has been desired.

The disclosure implements the technology in the following aspects.

(1) An aspect of the disclosure provides a fuel cell system. The fuel cell system includes a plurality of fuel cell units each including a fuel cell stack, an anode gas discharge system configured to discharge anode gas from the fuel cell stack, and a cathode gas supply and discharge system configured to supply cathode gas to the fuel cell stack and discharge cathode gas from the fuel cell stack, a mixed gas discharge system configured to mix gas discharged from the anode gas discharge system and the cathode gas supply and discharge system of each of the plurality of fuel cell units and discharge the mixed gas, and a controller configured to control the plurality of fuel cell units. The controller is configured to control at least one of the anode gas discharge system and the cathode gas supply and discharge system of each of the fuel cell units to shift a time at which gas to be discharged from each of the fuel cell units merges with each other in the mixed gas discharge system. According to this aspect, an increase in the hydrogen concentration of gas discharged from the mixed gas discharge system due to an overlap of the time is suppressed.

(2) In the fuel cell system according to the above aspect, each of the anode gas discharge systems of the plurality of fuel cell units may include an exhaust drain valve configured to exhaust gas discharged from the fuel cell stack, and an exhaust pipe connecting the exhaust drain valve and the mixed gas discharge system, and one or some of the exhaust pipes of the plurality of fuel cell units may have a volume different from a volume of another one or some of the exhaust pipes. According to this aspect, an increase in the hydrogen concentration of gas discharged from the mixed gas discharge system is suppressed. Therefore, with easy control, an increase in the hydrogen concentration of gas discharged from the mixed gas discharge system due to an overlap of the time is suppressed.

(3) In the fuel cell system according to the above aspect, each of the anode gas discharge systems may include an exhaust drain valve configured to exhaust gas discharged from the fuel cell stack, and the controller may be configured to open one or some of the exhaust drain valves at a different time from another one or some of the exhaust drain valves by controlling the exhaust drain valves to cause gas to be discharged from the anode gas discharge systems to the mixed gas discharge system. According to this aspect, even when the volume of each exhaust pipe is the same, the time at which gas merges with each other in the mixed gas discharge system can be shifted. Therefore, an increase in the hydrogen concentration of gas discharged from the mixed gas discharge system is suppressed.

(4) In the fuel cell system according to the above aspect, the controller may be configured to, at start-up of the fuel cell system, control each of the cathode gas supply and discharge systems to cause one or some of the cathode gas supply and discharge systems to supply cathode gas to the fuel cell stack at a time different from a time at which another one or some of the cathode gas supply and discharge systems each supply cathode gas to the fuel cell stack, and to discharge gas from an inside of the fuel cell stack. Gas discharged from the cathode gas supply and discharge system at start-up contains hydrogen moved from an anode to a cathode in the fuel cell stack during a stop of the fuel cell system. A time at which gas is discharged from each of the fuel cell stacks is set at a different time by controlling the cathode gas supply and discharge system at start-up, so a time at which gas merges with each other in the mixed gas discharge system can be shifted even when the volume of each exhaust pipe is the same. Therefore, an increase in the hydrogen concentration of gas discharged from the mixed gas discharge system is suppressed.

(5) Another aspect of the disclosure provides a control method for a fuel cell system. The fuel cell system includes a plurality of fuel cell units each including a fuel cell stack, an anode gas discharge system configured to discharge anode gas from the fuel cell stack, and a cathode gas supply and discharge system configured to supply cathode gas to the fuel cell stack and discharge cathode gas from the fuel cell stack, and a mixed gas discharge system configured to mix gas discharged from the anode gas discharge system and the cathode gas supply and discharge system of each of the plurality of fuel cell units and discharge the mixed gas. The control method includes controlling, by a controller, at least one of the anode gas discharge system and the cathode gas supply and discharge system of each of the fuel cell units to shift a time at which gas to be discharged from each of the fuel cell units merges with each other in the mixed gas discharge system.

The disclosure may be implemented in various modes and may be implemented in modes, such as a power generating apparatus including a fuel cell system, a vehicle including a fuel cell system, and a controller that executes a control method for a fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
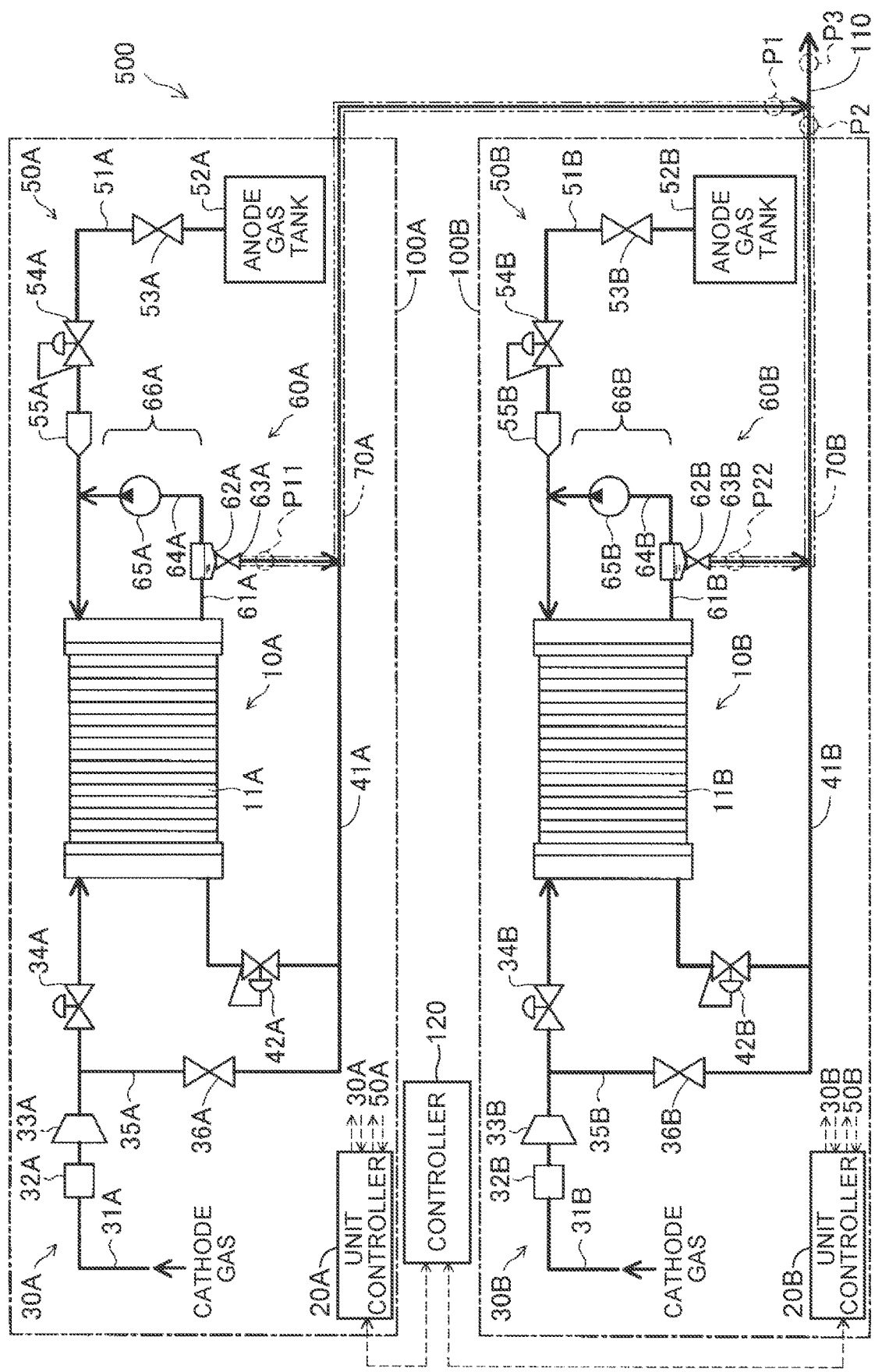
FIG. 1 is a diagram showing a schematic configuration of a fuel cell system.

FIG. 1 is a diagram showing a schematic configuration of a fuel cell system 500 according to one embodiment of the disclosure. The fuel cell system 500 includes a first fuel cell unit 100A, a second fuel cell unit 100B, a mixed gas discharge system 110, and a controller 120. In the present embodiment, the fuel cell system 500 is of a stationary type. However, the fuel cell system 500 is not limited thereto and may be mounted on a fuel cell electric vehicle.

The configuration of the first fuel cell unit 100A and the configuration of the second fuel cell unit 100B are the same. Therefore, the configuration of the first fuel cell unit 100A will be mainly described, and the description of the configuration of the second fuel cell unit 100B is omitted as appropriate. As shown in FIG. 1, reference numerals with the suffix "A" are assigned to the component elements of the first fuel cell unit 100A, and reference numerals with the suffix "B" instead of "A" are assigned to the component elements of the second fuel cell unit 100B. To distinguish the components of the first fuel cell unit 100A and the components of the second fuel cell unit 100B from each other, "first" and "second" may be prefixed as in the case of, for example, "first fuel cell stack 10A" and "second fuel cell stack 10B".

The first fuel cell unit 100A includes a fuel cell stack 10A, a unit controller 20A, a cathode gas supply and discharge system 30A, and an anode gas supply and discharge system 50A.

The fuel cell stack 10A is a polymer electrolyte fuel cell that generates electric power by using anode gas, such as hydrogen gas, and cathode gas, such as air, supplied as reaction gases. The fuel cell stack 10A is made up of a plurality of laminated single cells 11A. Each of the single cells 11A includes a membrane electrode assembly (not shown), and a pair of separators (not shown). In the membrane electrode assembly, an anode (not shown) and a cathode (not shown) are respectively disposed on both surfaces of an electrolyte membrane (not shown). The pair of separators sandwiches the membrane electrode assembly.

The unit controller 20A is a computer including a CPU, a memory, and an interface circuit. Parts (described later) are connected to the interface circuit. The unit controller 20A outputs signals for controlling the start and stop of each device in the fuel cell stack 10A in accordance with instructions from the controller 120. The unit controller 20A runs a control program stored in the memory to control the power generation of the fuel cell system 500 and to controls the operation to discharge gas from the cathode gas supply and discharge system 30A or an anode gas discharge system 60A of the anode gas supply and discharge system 50A to the mixed gas discharge system 110. In the unit controller 20A, one, some, or all of the controls may be implemented as hardware circuits.

The cathode gas supply and discharge system 30A supplies cathode gas to the fuel cell stack 10A and discharges cathode gas from the fuel cell stack 10A. The cathode gas supply and discharge system 30A includes a cathode gas line 31A, an air flow meter 32A, a compressor 33A, an inlet valve 34A, a bypass line 35A, a bypass valve 36A, a cathode off-gas line 41A, and a cathode gas regulator 42A. The cathode gas line 31A is connected to the fuel cell stack 10A and supplies the fuel cell stack 10A with air taken in from the outside.

The air flow meter 32A is provided in the cathode gas line 31A and measures the amount of intake air supplied. The compressor 33A is provided between the air flow meter 32A and the inlet valve 34A. The compressor 33A compresses air taken in from the outside and supplies the air to the fuel cell stack 10A as a cathode gas in accordance with a control signal from the unit controller 20A. The compressor 33A is driven by consuming electric power. The inlet valve 34A is provided between the compressor 33A and the fuel cell stack 10A. The inlet valve 34A is made up of an electromagnetic valve or an electric operated valve that opens or closes in accordance with a control signal from the unit controller 20A. The opening degree of the inlet valve 34A is adjusted under the control of the unit controller 20A. Thus, the inlet valve 34A adjusts the flow rate of cathode gas to be supplied to the fuel cell stack 10A.

The bypass line 35A connects the cathode gas line 31A and the cathode off-gas line 41A without passing through the fuel cell stack 10A. The bypass valve 36A is provided in the bypass line 35A. The bypass valve 36A is made up of an electromagnetic valve or an electric operated valve that opens or closes in accordance with a control signal from the unit controller 20A. When the bypass valve 36A is open, part of air flowing through the cathode gas line 31A flows into the cathode off-gas line 41A via the bypass line 35A.

The cathode off-gas line 41A discharges cathode off-gas discharged from the fuel cell stack 10A and cathode gas flowing out from the bypass line 35A to the mixed gas discharge system 110. The cathode gas regulator 42A is provided in the cathode off-gas line 41A. The cathode gas regulator 42A adjusts the pressure at a cathode gas outlet of the fuel cell stack 10A in accordance with a control signal from the unit controller 20A.

The anode gas supply and discharge system 50A supplies anode gas to the fuel cell stack 10A and discharges anode gas from the fuel cell stack 10A. The anode gas supply and discharge system 50A includes an anode gas line 51A, an anode gas tank 52A, a main stop valve 53A, an anode gas regulator 54A, an injector 55A, an anode off-gas line 61A, a gas-liquid separator 62A, an exhaust drain valve 63A, a circulation line 64A, and an anode gas pump 65A. In the present embodiment, a channel made up of the anode off-gas line 61A, the gas-liquid separator 62A, and the exhaust drain valve 63A is also referred to as anode gas discharge system 60A. The anode gas discharge system 60A discharges anode gas from the fuel cell stack 10A. In the following description, a channel made up of a part of the anode gas line 51A, downstream of the injector 55A, a channel for anode gas in the fuel cell stack 10A, the anode off-gas line 61A, the gas-liquid separator 62A, the circulation line 64A, and the anode gas pump 65A is also referred to as circulation channel 66A. The circulation channel 66A is a channel for circulating anode off-gas from the fuel cell stack 10A back to the fuel cell stack 10A.

The anode gas tank 52A is connected to an anode gas inlet of the fuel cell stack 10A via the anode gas line 51A and supplies anode gas to the fuel cell stack 10A. The main stop valve 53A, the anode gas regulator 54A, and the injector 55A are provided in the anode gas line 51A in this order from the upstream side, that is, from the side adjacent to the anode gas tank 52A.

The main stop valve 53A is made up of an electromagnetic valve or an electric operated valve that opens or closes in accordance with a control signal from the unit controller 20A. The main stop valve 53A is closed during a stop of the fuel cell system 500. The anode gas regulator 54A adjusts the pressure of anode gas upstream of the injector 55A in accordance with a control signal from the unit controller 20A. The injector 55A is an electromagnetically operated on-off valve of which a valve element is electromagnetically operated in accordance with an operation period and a valve open duration set by the unit controller 20A. The unit controller 20A controls the amount of anode gas to be supplied to the fuel cell stack 10A by controlling the operation period and the valve open duration of the injector 55A.

The anode off-gas line 61A is a line that connects an anode gas outlet of the fuel cell stack 10A and the gas-liquid separator 62A. The anode off-gas line 61A guides anode off-gas containing hydrogen gas, nitrogen gas, and the like not used for power generation reaction to the gas-liquid separator 62A.

The gas-liquid separator 62A is connected between the anode off-gas line 61A and the circulation line 64A in the circulation channel 66A. The gas-liquid separator 62A separates at least part of liquid water contained in gas from the gas discharged from the fuel cell stack 10A. More specifically, the gas-liquid separator 62A separates water as impurities from anode off-gas in the circulation channel 66A and stores the water.

The exhaust drain valve 63A is provided at the lower part of the gas-liquid separator 62A. The exhaust drain valve 63A exhausts gas discharged from the fuel cell stack 10A. More specifically, the exhaust drain valve 63A drains water stored in the gas-liquid separator 62A and exhausts unnecessary gas, mainly, nitrogen gas, in the gas-liquid separator 62A. During operation of the fuel cell system 500, the exhaust drain valve 63A is normally closed and opens or closes in accordance with a control signal from the unit controller 20A. In the present embodiment, the exhaust drain valve 63A is connected to the cathode off-gas line 41A, and water and unnecessary gas discharged by the exhaust drain valve 63A are discharged to the mixed gas discharge system 110 through the cathode off-gas line 41A. A line from a part downstream of the exhaust drain valve 63A to the mixed gas discharge system 110 is also referred to as exhaust pipe 70A. In the present embodiment, the first exhaust pipe 70A and a second exhaust pipe 70B have the same volume.

The circulation line 64A is connected to a part of the anode gas line 51A, downstream of the injector 55A. The anode gas pump 65A is provided in the circulation line 64A. The anode gas pump 65A is operated in accordance with a control signal from the unit controller 20A. Anode off-gas from which water is separated by the gas-liquid separator 62A is pumped out to the anode gas line 51A by the anode gas pump 65A. In the fuel cell system 500, the efficiency of use of anode gas is improved by circulating anode off-gas containing hydrogen and supplying the anode off-gas to the fuel cell stack 10A again.

The mixed gas discharge system 110 mixes gas discharged from each of the cathode gas supply and discharge systems 30A, 30B and the anode gas discharge systems 60A, 60B and discharges the mixed gas. More specifically, the mixed gas discharge system 110 communicates with the outside of a housing (not shown) in which the fuel cell units 100A, 100B are accommodated, and discharges gas discharged from the fuel cell stack 10A via the cathode off-gas line 41A and gas discharged from the fuel cell stack 10B via the cathode off-gas line 41B to the atmosphere outside the housing together.

The controller 120 controls each of the fuel cell units 100A, 100B by providing an instruction to an associated one of the unit controllers 20A, 20B. More specifically, the controller 120 controls the anode gas discharge systems 60A, 60B and the cathode gas supply and discharge systems 30A, 30B via the unit controllers 20A, 20B to shift a time at which gas discharged from each of the fuel cell units 100A, 100B merges with each other in the mixed gas discharge system 110. The controller 120 controls operation in consideration of the flow rate and hydrogen concentration of gas discharged from each of the fuel cell units 100A, 100B and the volumes of the exhaust pipes 70A, 70B. Thus, the controller 120 is able to prevent an excess hydrogen concentration of gas to be discharged from the mixed gas discharge system 110 over a predetermined value.

Figure 2:
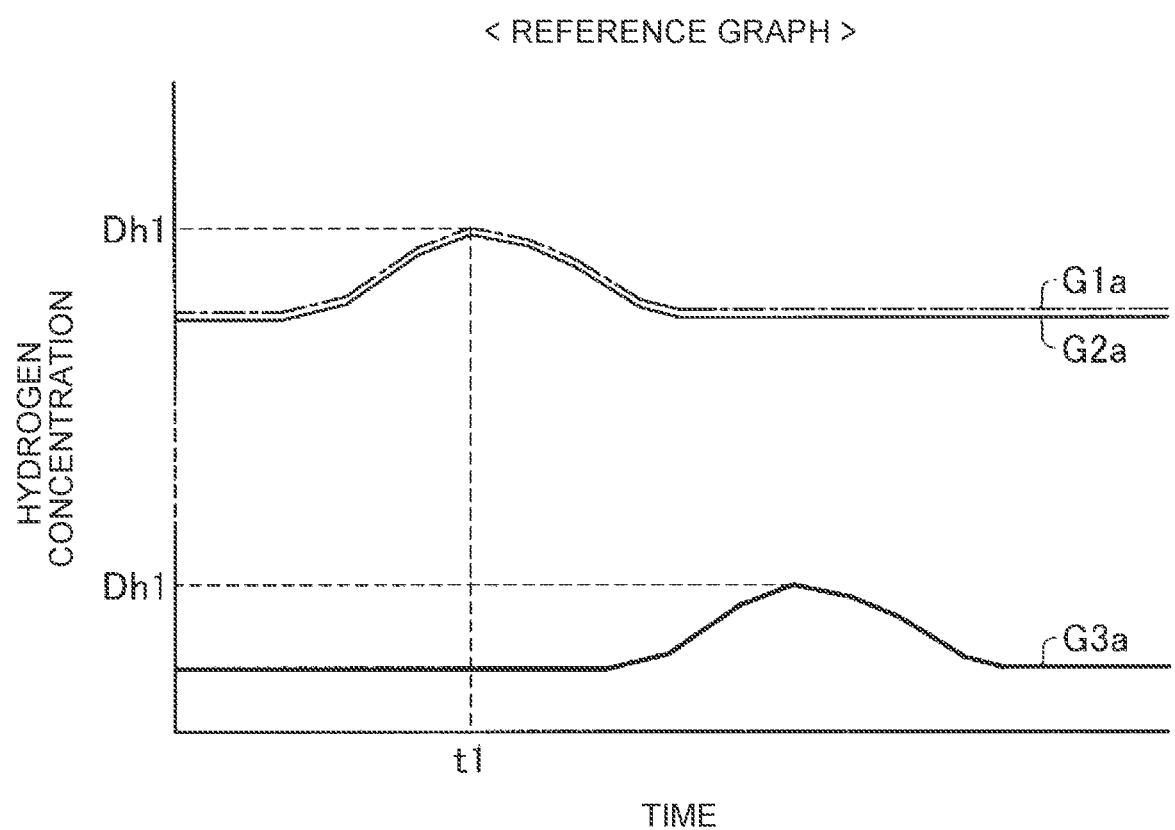
FIG. 2 is a reference graph showing the relationship between a time to discharge gas and a hydrogen concentration.

FIG. 2 is a reference graph showing the relationship between time at which each of the fuel cell units 100A, 100B discharges gas, and hydrogen concentration. The top graph G1a represents the hydrogen concentration of gas to be discharged from the first fuel cell unit 100A. More specifically, the graph G1a represents the hydrogen concentration of gas at a point P1 (FIG. 1) in the first exhaust pipe 70A immediately upstream of a point where the first exhaust pipe 70A and the mixed gas discharge system 110 are connected. The top graph G2a represents the hydrogen concentration of gas to be discharged from the second fuel cell unit 100B. More specifically, the graph G2a represents the hydrogen concentration of gas at a point P2 (FIG. 1) in the second exhaust pipe 70B immediately upstream of a point where the second exhaust pipe 70B and the mixed gas discharge system 110 are connected. For the sake of convenience of description, the graph G2a is shifted downward; however, the graph G2a actually overlaps the graph G1a. The bottom graph G3a represents the hydrogen concentration of gas to be discharged from the mixed gas discharge system 110. More specifically, the graph G3a represents the hydrogen concentration of gas at a point P3 (FIG. 1) immediately upstream of a point where gas is discharged to the outside in the mixed gas discharge system 110.

As shown in FIG. 2, the first fuel cell unit 100A discharges gas to the mixed gas discharge system 110 and the second fuel cell unit 100B discharges gas to the mixed gas discharge system 110 at the same time. Therefore, the hydrogen concentration of gas at the point P1 to be discharged from the fuel cell unit 100A and the hydrogen concentration of gas at the point P2 to be discharged from the fuel cell unit 100B are highest at the same time t1. The peak of the hydrogen concentration of gas to be discharged from the fuel cell unit 100A and the peak of the hydrogen concentration of gas to be discharged from the fuel cell unit 100B each are a first concentration Dh1. The first concentration Dh1 is, for example, 8%. Therefore, the hydrogen concentration of gas in the mixed gas discharge system 110 increases up to the first concentration Dh1.

Figure 3:
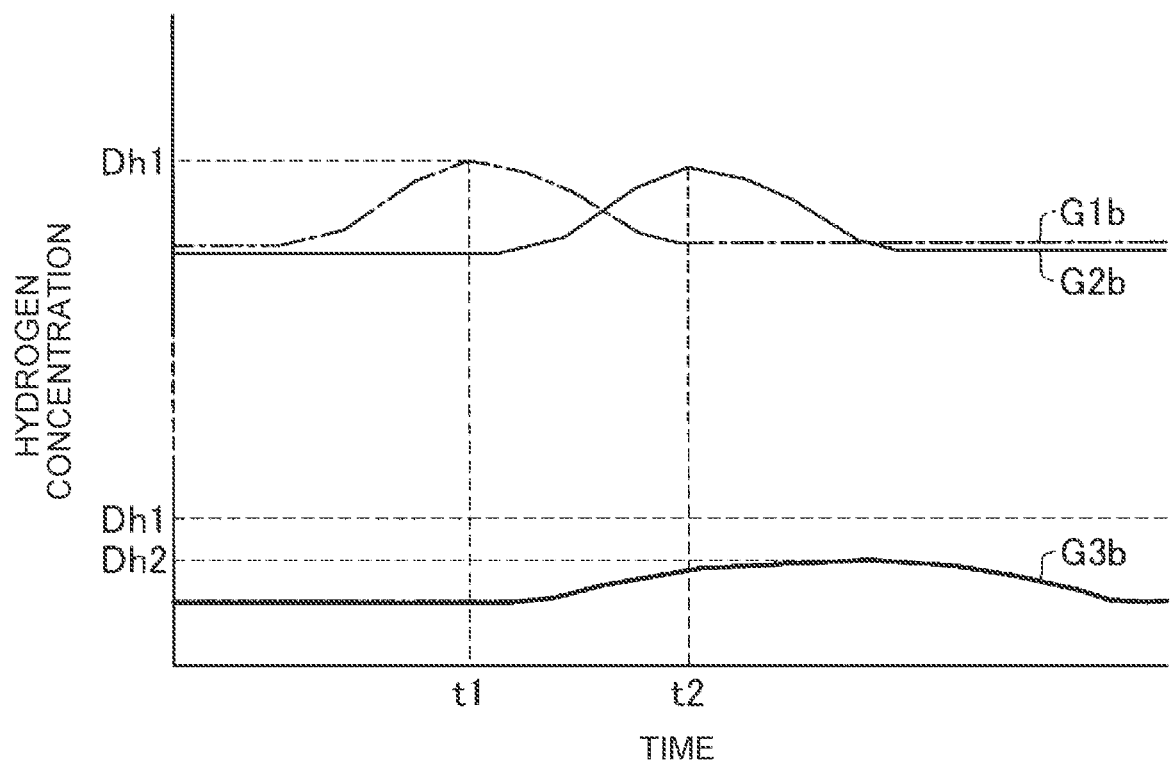
FIG. 3 is a graph showing the relationship between a time to discharge gas and a hydrogen concentration.

FIG. 3 is a graph showing the relationship between time at which each of the fuel cell units 100A, 100B discharges gas, and hydrogen concentration according to the present embodiment. The top graph G1b represents the hydrogen concentration of gas to be discharged from the first fuel cell unit 100A. More specifically, the graph G1b represents the hydrogen concentration of gas at the point P1 in the first exhaust pipe 70A immediately upstream of the point where the first exhaust pipe 70A and the mixed gas discharge system 110 are connected. The top graph G2b represents the hydrogen concentration of gas to be discharged from the second fuel cell unit 100B. More specifically, the graph G2b represents the hydrogen concentration of gas at the point P2 in the second exhaust pipe 70B immediately upstream of the point where the second exhaust pipe 70B and the mixed gas discharge system 110 are connected. For the sake of convenience of description, the graph G2b is shifted downward; however, the graph G2b actually partially overlaps the graph G1b. The bottom graph G3b represents the hydrogen concentration of gas to be discharged from the mixed gas discharge system 110. More specifically, the graph G3b represents the hydrogen concentration of gas at the point P3 immediately upstream of the point where gas is discharged to the outside in the mixed gas discharge system 110.

As shown in FIG. 3, the hydrogen concentration of gas at the point P1 to be discharged from the first fuel cell unit 100A is highest at time t1. The second fuel cell unit 100B discharges gas to the mixed gas discharge system 110 at a time later than the first fuel cell unit 100A. Therefore, the hydrogen concentration of gas at the point P2 to be discharged from the second fuel cell unit 100B is highest at time t2 later than time t1. In other words, at time t1, gas with the first concentration Dh1 to be discharged from the first fuel cell unit 100A to the mixed gas discharge system 110 is diluted by gas with a hydrogen concentration lower than the first concentration Dh1 to be discharged from the second fuel cell unit 100B. At time t2, gas with the first concentration Dh1 to be discharged from the second fuel cell unit 100B to the mixed gas discharge system 110 is diluted by gas with a hydrogen concentration lower than the first concentration Dh1 to be discharged from the first fuel cell unit 100A. Therefore, the peak of the hydrogen concentration of gas in the mixed gas discharge system 110 is a second concentration Dh2 lower than the first concentration Dh1. The second concentration Dh2 is, for example, 4%.

Figure 4:
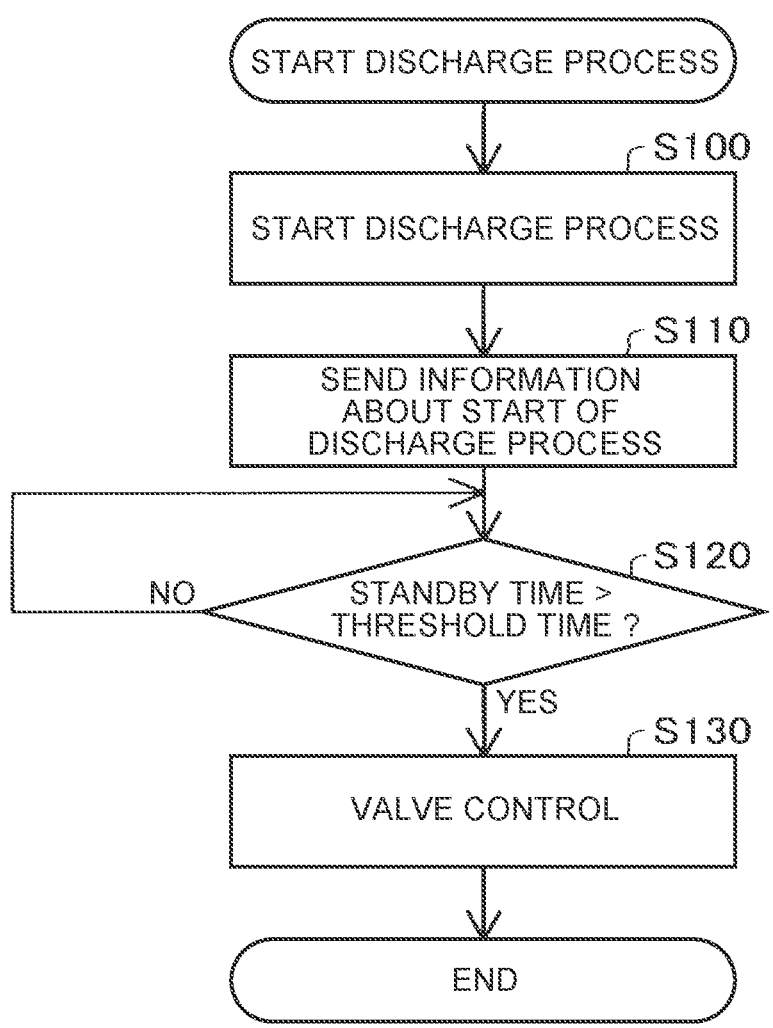
FIG. 4 is a flowchart showing an example of the procedure of a discharge process.

FIG. 4 is a flowchart showing an example of the procedure of a discharge process according to the present embodiment. The discharge process is a process of, to discharge gas from each of the fuel cell units 100A, 100B to the mixed gas discharge system 110, controlling at least one of a set of the cathode gas supply and discharge systems 30A, 30B and a set of the anode gas discharge systems 60A, 60B. This process is a process to be performed by the unit controllers 20A, 20B that receive an instruction to start the discharge process from the controller 120 during operation of the fuel cell system 500. The instruction to start the discharge process is, for example, issued to, immediately after start-up of the fuel cell system 500, discharge hydrogen permeated from an anode side to a cathode side in the fuel cell stack 10A during a stop of the fuel cell system 500. Hereinafter, the first unit controller 20A will be described as an example.

In step S100, the unit controller 20A starts the discharge process. For example, the unit controller 20A feeds cathode gas to the fuel cell stack 10A by controlling the air flow meter 32A, the compressor 33A, and the inlet valve 34A. Thus, hydrogen permeated from the anode side to the cathode side in the fuel cell stack 10A during a stop of the fuel cell system 500 is discharged to the outside of the fuel cell stack 10A. The unit controller 20A feeds anode gas to the fuel cell stack 10A by controlling the main stop valve 53A, the anode gas regulator 54A, the injector 55A, and the anode gas pump 65A.

In step S110, the unit controller 20A sends information about the start of the discharge process to the controller 120.

In step S120, the unit controller 20A determines whether a standby time from completion of step S110 is longer than a predetermined threshold time. In other words, the unit controller 20A determines whether the unit controller 20A has been on standby for a time longer than the threshold time. The threshold time is a time determined in advance for each fuel cell unit. In the present embodiment, the threshold time of the first fuel cell unit 100A is shorter than the threshold time of the second fuel cell unit 100B. A difference between the threshold time of the first fuel cell unit 100A and the threshold time of the second fuel cell unit 100B is determined by, for example, determining a time taken to reach a hydrogen concentration higher than or equal to a reference value through simulation or experiment in advance based on a time change in hydrogen concentration in the case where gas is discharged from a fuel cell unit. An instruction for the standby time is provided by the controller 120 to each of the unit controllers 20A, 20B. Hereinafter, the instruction is also referred to as valve control instruction. In the present embodiment, the controller 120 provides a valve control instruction upon receiving a signal to start the discharge process, transmitted from the unit controller 20A in step S110. The controller 120 may provide a valve control instruction with an instruction to start the discharge process. When the standby time is longer than the threshold time, the unit controller 20A proceeds to step S130. On the other hand, when the standby time is shorter than or equal to the threshold time, the unit controller 20A returns to step S120. In other words, the unit controller 20A repeats step S120 until the threshold time elapses.

In step S130, the unit controller 20A executes valve control. For example, the unit controller 20A controls operation to open the bypass valve 36A, the cathode gas regulator 42A, and the exhaust drain valve 63A. Thus, gas is discharged to the cathode off-gas line 41A. In other words, gas is discharged from the cathode gas supply and discharge system 30A and the anode gas discharge system 60A to the mixed gas discharge system 110.

With the fuel cell system 500 according to the present embodiment described above, the controller 120 is able to shift a time at which gas discharged from each of the fuel cell units 100A, 100B merges with each other in the mixed gas discharge system 110. Therefore, an increase in the hydrogen concentration of gas discharged from the mixed gas discharge system due to an overlap of the time is suppressed.

The fuel cell system 500 mixes gas discharged from each of the first fuel cell unit 100A and the second fuel cell unit 100B and discharges the mixed gas by using the mixed gas discharge system 110. Therefore, in comparison with the case where gas is individually discharged from each of the first fuel cell unit 100A and the second fuel cell unit 100B, the number of lines is reduced. In addition, for example, the hydrogen concentration of gas to be discharged from the first anode gas discharge system 60A is diluted not only by gas to be discharged from the first cathode gas supply and discharge system 30A but also gas to be discharged from the second cathode gas supply and discharge system 30B. Therefore, the hydrogen concentration of gas to be discharged from the first anode gas discharge system 60A is diluted without increasing the flow rate of cathode gas to be supplied to the first cathode gas supply and discharge system 30A.

B. Second Embodiment

The configuration of the fuel cell system according to the second embodiment differs from the configuration of the fuel cell system according to the first embodiment in that the volume of the first exhaust pipe 70A is different from the volume of the second exhaust pipe 70B. The other configuration is the same as that of the first embodiment, so the description of the configuration of the fuel cell system is omitted.

Figure 5:
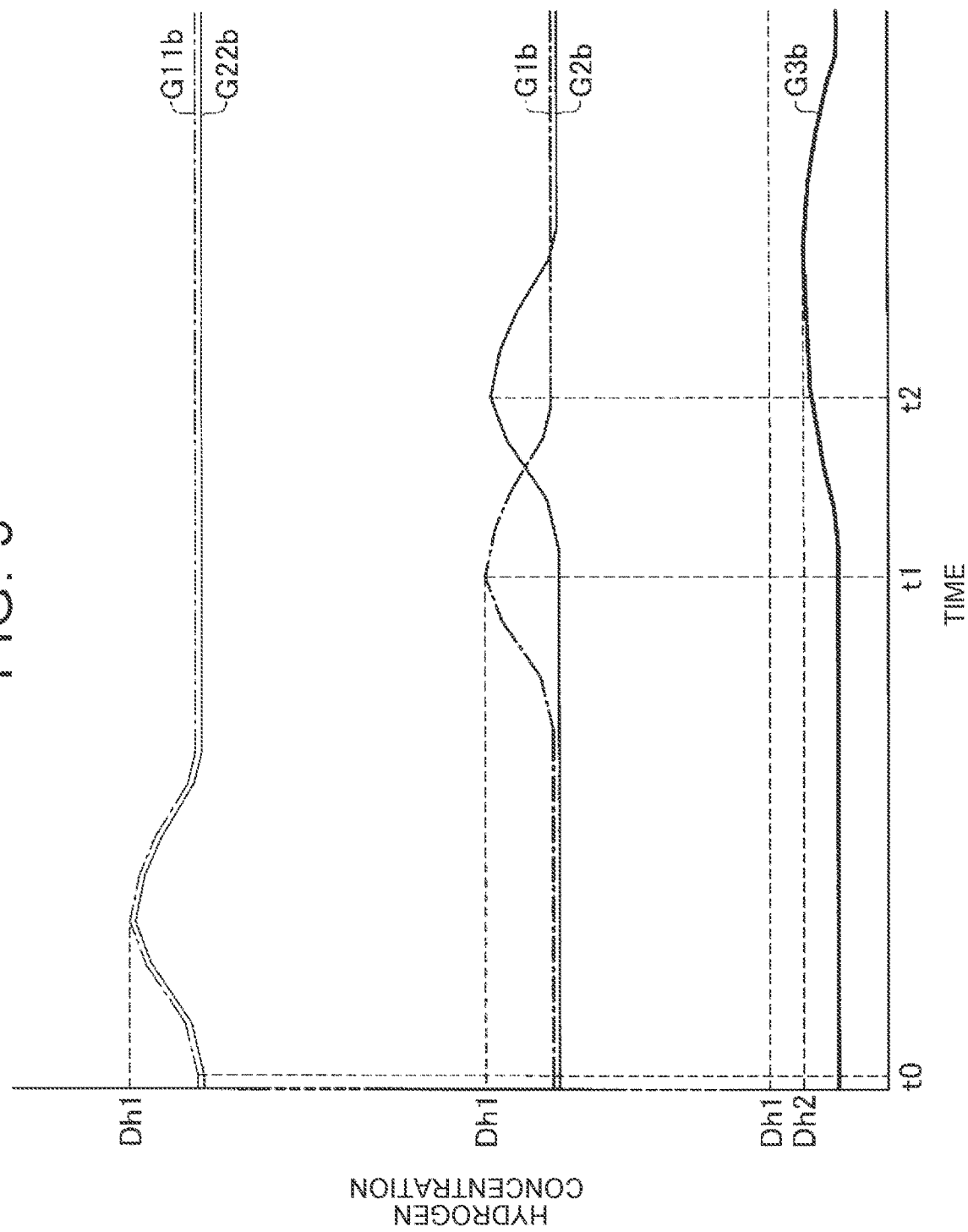
FIG. 5 is a graph showing the relationship between a time to discharge gas and a hydrogen concentration according to a second embodiment.

FIG. 5 is a graph showing the relationship between time at which each of the fuel cell units 100A, 100B discharges gas, and hydrogen concentration according to the present embodiment. This graph shows the graph G11b and the graph G22b in addition to FIG. 3. The top graph G11b represents the hydrogen concentration of gas to be discharged from the first anode gas discharge system 60A to the first exhaust pipe 70A. More specifically, the graph G11b represents the hydrogen concentration of gas at a point P11 (FIG. 1) in the first exhaust pipe 70A immediately downstream of a point where the first anode gas discharge system 60A and the first exhaust pipe 70A are connected. The top graph G22b represents the hydrogen concentration of gas to be discharged from the second anode gas discharge system 60B to the second exhaust pipe 70B. More specifically, the graph G22b represents the hydrogen concentration of gas at a point P22 (FIG. 1) in the second exhaust pipe 70B immediately downstream of a point where the second anode gas discharge system 60B and the second exhaust pipe 70B are connected. For the sake of convenience of description, the graph G22b is shifted downward; however, the graph G22b actually partially overlaps the graph G11b.

In the case where the volume of the first exhaust pipe 70A is equal to the volume of the second exhaust pipe 70B, when gas is discharged from the first anode gas discharge system 60A to the first exhaust pipe 70A and gas is discharged from the second anode gas discharge system 60B to the second exhaust pipe 70B at the same time, the first fuel cell unit 100A discharges gas to the mixed gas discharge system 110 and the second fuel cell unit 100B discharges gas to the mixed gas discharge system 110 at the same time, as shown in FIG. 2. In other words, the first exhaust pipe 70A discharges gas to the mixed gas discharge system 110 and the second exhaust pipe 70B discharges gas to the mixed gas discharge system 110 at the same time.

In the present embodiment, the volume of the second exhaust pipe 70B is greater than the volume of the first exhaust pipe 70A. More specifically, the diameter of the first exhaust pipe 70A and the diameter of the second exhaust pipe 70B are the same, and the distance of the second exhaust pipe 70B in the flow direction of gas is longer than the distance of the first exhaust pipe 70A in the flow direction of gas. Therefore, as shown at the top of FIG. 5, even when gas is discharged from the first anode gas discharge system 60A to the first exhaust pipe 70A and gas is discharged from the second anode gas discharge system 60B to the second exhaust pipe 70B at the same time t0, the first fuel cell unit 100A discharges gas to the mixed gas discharge system 110 later than the second fuel cell unit 100B discharges gas to the mixed gas discharge system 110, as shown in the middle of FIG. 5. Therefore, the hydrogen concentration of gas at the point P2 to be discharged from the second fuel cell unit 100B is highest at time t2 later than time t1 at which the hydrogen concentration of gas at the point P1 to be discharged from the first fuel cell unit 100A is highest.

With the fuel cell system 500 according to the second embodiment as described above, a difference in volume between the exhaust pipes is designed such that, even when gas is discharged from each of the cathode gas supply and discharge systems 30A, 30B and the anode gas discharge systems 60A, 60B at the same time, gas merges into the mixed gas discharge system 110 at a different time. In other words, with a difference in volume between the exhaust pipes, even when gas is discharged from the cathode gas supply and discharge systems 30A, 30B and the anode gas discharge systems 60A, 60B at the same time, the time at which gas merges into the mixed gas discharge system 110 can be shifted. Therefore, an increase in the hydrogen concentration of gas discharged from the mixed gas discharge system 110 is suppressed. Therefore, with easy control, an increase in the hydrogen concentration of gas discharged from the mixed gas discharge system 110 due to an overlap of the time is suppressed.

C. Third Embodiment

A discharge process according to a third embodiment is a process to be performed during power generation of the fuel cell system 500. The configuration of the fuel cell system according to the third embodiment is the same as the configuration of the fuel cell system according to the first embodiment, so the description of the configuration of the fuel cell system is omitted.

In the third embodiment, the controller 120 causes the first exhaust drain valve 63A and the second exhaust drain valve 63B to open at different times such that the hydrogen concentration of gas to be discharged from the mixed gas discharge system 110 is lower than a predetermined value. The controller 120 obtains the amount of hydrogen to be discharged from each of the exhaust drain valves 63A, 63B by using, for example, a reaction ratio between anode gas and cathode gas, obtained from the amount of electric power generated by each of the fuel cell stacks 10A, 10B, and a reduction in atmospheric pressure measured by a manometer provided in each of the anode off-gas lines 61A, 61B. The controller 120 is able to estimate the hydrogen concentration of gas to be discharged from the mixed gas discharge system 110 by using, for example, the obtained amount of hydrogen and the flow rate of cathode gas to be discharged from each of the first cathode gas supply and discharge system 30A and the second cathode gas supply and discharge system 30B, and controls the time to open the first exhaust drain valve 63A and the time to open the second exhaust drain valve 63B based on the estimation.

The controller 120, for example, transmits a standby time (FIG. 4, step S120) to each of the unit controllers 20A, 20B by setting a difference in time interval to be taken until the hydrogen concentration of gas to be discharged from each of the fuel cell units 100A, 100B decreases from the peak to a normal concentration as a valve control instruction.

With the fuel cell system 500 according to the present embodiment described above, the controller 120 causes the exhaust drain valves 63A, 63B to open at different times to discharge gas from the anode gas discharge systems 60A, 60B to the mixed gas discharge system 110. Even when the volume of the first exhaust pipe 70A and the volume of the second exhaust pipe 70B are the same, the time at which gas merges into the mixed gas discharge system 110 can be shifted. Therefore, an increase in the hydrogen concentration of gas discharged from the mixed gas discharge system 110 is suppressed.

D. Fourth Embodiment

A discharge process according to a fourth embodiment is a process to be performed after start-up of the fuel cell system 500. The configuration of the fuel cell system according to the fourth embodiment is the same as the configuration of the fuel cell system according to the first embodiment, so the description of the configuration of the fuel cell system is omitted.

In the fourth embodiment, the controller 120 causes the first cathode gas supply and discharge system 30A and the second cathode gas supply and discharge system 30B to discharge gas to the mixed gas discharge system 110 at different times. More specifically, the controller 120 causes the first inlet valve 34A and the second inlet valve 34B to open at different times to cause the first cathode gas supply and discharge system 30A and the second cathode gas supply and discharge system 30B to discharge gas to the mixed gas discharge system 110 at different times. Thus, the time at which gas to be discharged from the cathode gas supply and discharge systems 30A, 30B, the gas containing hydrogen moved from the anode to the cathode in the fuel cell stacks 10A, 10B during a stop of the fuel cell system 500, merges into the mixed gas discharge system 110 can be shifted.

Figure 6:
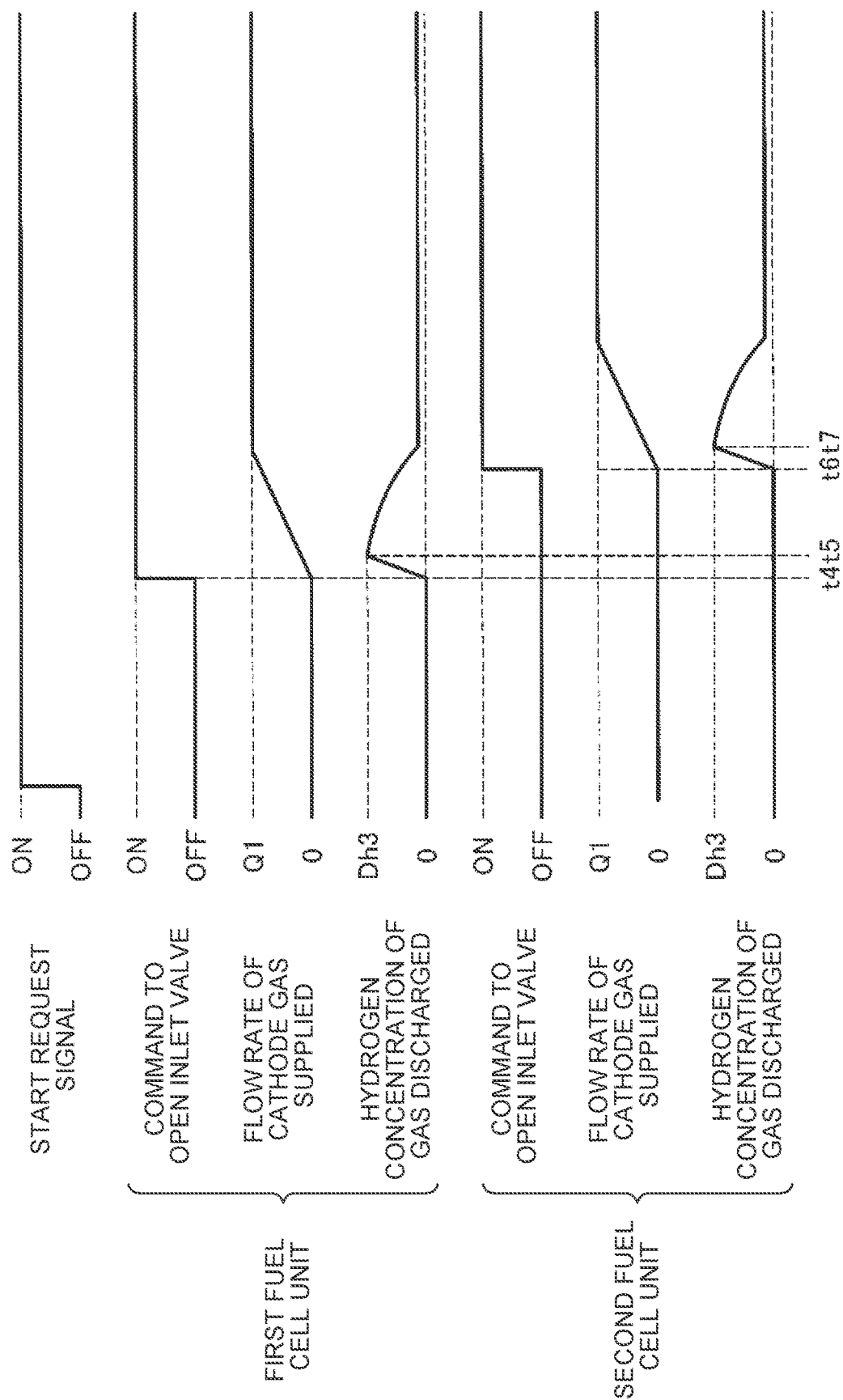
FIG. 6 is a view illustrating an example of a timing chart.

FIG. 6 is a view showing an example of a timing chart showing the ON/OFF state of a start request signal, a command to open each of the inlet valves 34A, 34B, and the flow rate of cathode gas supplied in each of the fuel cell units 100A, 100B. In FIG. 6, the ON state of the start request signal means that a start request is issued, and the OFF state means that a start request is not issued. The hydrogen concentration in FIG. 6 represents the hydrogen concentration of gas in the first exhaust pipe 70A immediately upstream of the point where the first exhaust pipe 70A and the mixed gas discharge system 110 are connected and the hydrogen concentration of gas in the second exhaust pipe 70B immediately upstream of the point where the second exhaust pipe 70B and the mixed gas discharge system 110 are connected. The case where the exhaust drain valves 63A, 63B are closed will be described as an example. In other words, the case where gas is not discharged from the anode gas discharge systems 60A, 60B to the mixed gas discharge system 110 will be described as an example.

As shown in FIG. 6, after the start request signal is set to the ON state, the first fuel cell unit 100A receives a command to open the inlet valve 34A at time t4 and opens the first inlet valve 34A. Therefore, the flow rate of cathode gas supplied in the first fuel cell unit 100A increases from time t4 and becomes the flow rate Q1. The hydrogen concentration of discharge gas in the first fuel cell unit 100A increases from time t4, reaches a highest concentration Dh3 at time t5 later than time t4, and decreases. The second fuel cell unit 100B receives a command to open the second inlet valve 34B at time t6 later than time t4, and opens the second inlet valve 34B. Time t6 can be determined through simulation or experiment in advance such that the hydrogen concentration of gas to be discharged from the mixed gas discharge system 110 is lower than the predetermined value. Therefore, the flow rate of cathode gas supplied in the second fuel cell unit 100B increases from time t6 and becomes the flow rate Q1. The hydrogen concentration of discharge gas in the second fuel cell unit 100B increases from time t6, reaches the highest concentration Dh3 at time t7 later than time t6, and decreases. Therefore, in the mixed gas discharge system 110, the time at which gas with the concentration Dh3 to be discharged from the cathode gas supply and discharge system 30A merges and the time at which gas with the concentration Dh3 to be discharged from the second cathode gas supply and discharge system 30B merges are shifted from each other.

With the fuel cell system 500 according to the present embodiment described above, at start-up of the fuel cell system 500, the controller 120 controls the cathode gas supply and discharge systems 30A, 30B to cause the first cathode gas supply and discharge system 30A to supply cathode gas to the fuel cell stack 10A at a time different from a time at which the second cathode gas supply and discharge system 30B is caused to supply cathode gas, and to discharge gas from the inside of the fuel cell stack 10A. Gas discharged from the cathode gas supply and discharge systems 30A, 30B at start-up contains hydrogen moved from the anode to the cathode in the fuel cell stacks 10A, 10B during a stop of the fuel cell system 500. The time to discharge gas from each of the fuel cell stacks 10A, 10B is shifted by controlling the cathode gas supply and discharge system 30A at start-up, so the time at which gas merges into the mixed gas discharge system 110 can be shifted from each other even when the volume of the first exhaust pipe 70A and the volume of the second exhaust pipe 70B are the same. Therefore, an increase in the hydrogen concentration of gas discharged from the mixed gas discharge system 110 is suppressed.

Figure 7:
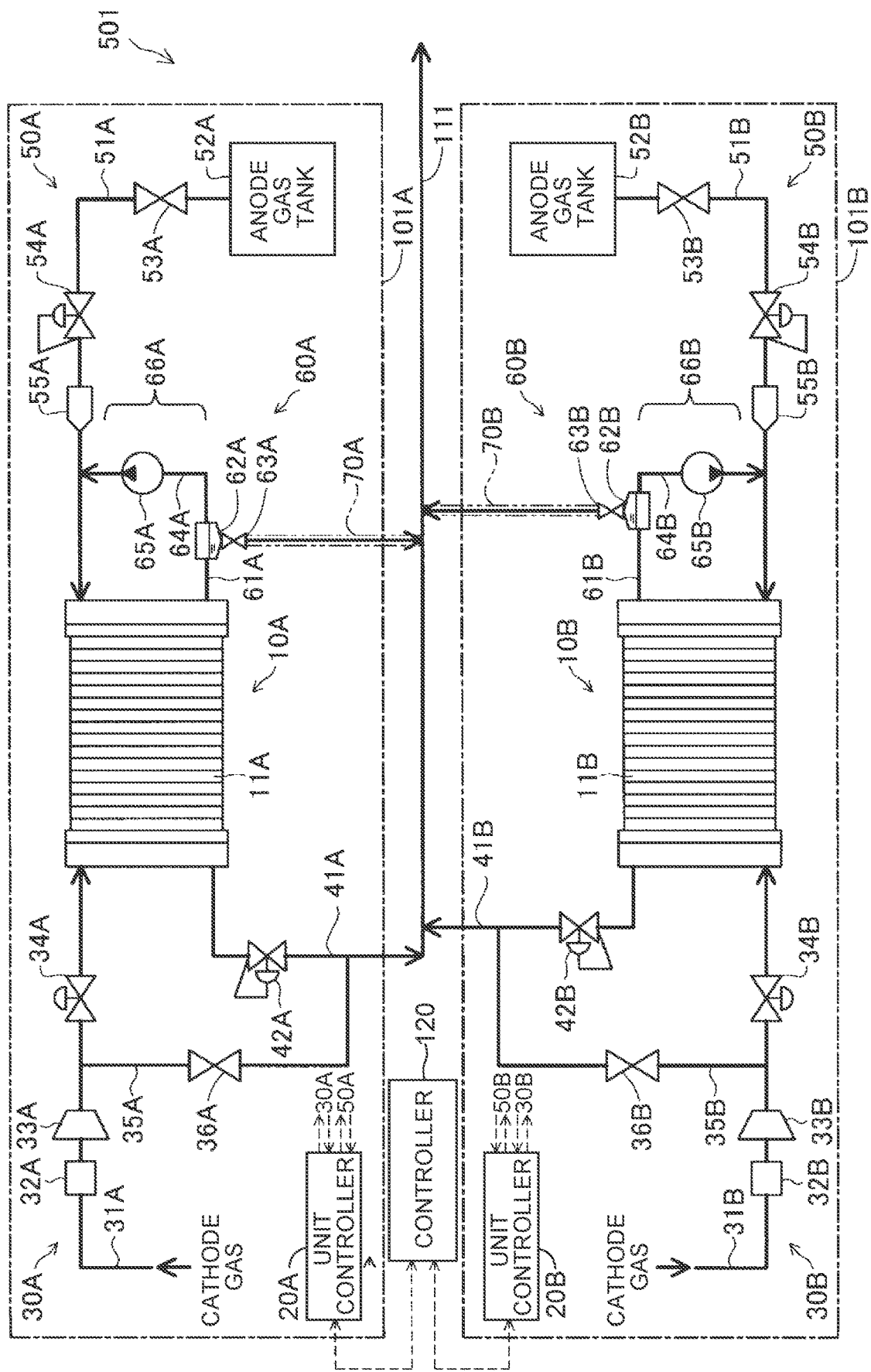
FIG. 7 is a diagram illustrating a fuel cell system according to an embodiment.

E. Other Embodiments (E1) FIG. 7 is a diagram illustrating a fuel cell system 501 according to an embodiment. In the above-described embodiments, in the fuel cell unit 100A, gas discharged from the cathode gas supply and discharge system 30A and gas discharged from the anode gas discharge system 60A are mixed in the cathode off-gas line 41A and discharged. Alternatively, as shown in FIG. 7, in a fuel cell unit 101A, gas discharged from the cathode gas supply and discharge system 30A and gas discharged from the anode gas discharge system 60A may be directly discharged to a mixed gas discharge system 111 without being mixed. The same applies to a fuel cell unit 101B shown in FIG. 7.

(E2) In the above-described embodiments, the fuel cell system 500 includes two fuel cell units. However, the configuration is not limited thereto, and the fuel cell system 500 just needs to include a plurality of fuel cell units and may include three or more fuel cell units. In this case, the controller 120 controls operation such that gas discharged from one or some of the fuel cell units merges into the mixed gas discharge system 110 at a time different from a time at which gas discharged from another one or some of the fuel cell units merges into the mixed gas discharge system 110. When, for example, the fuel cell system 500 includes three fuel cell units, gas discharged from one of the fuel cell units just needs to merge into the mixed gas discharge system 110 at a time different from a time at which gas discharged from the other two fuel cell units merges into the mixed gas discharge system 110, and gas discharged from the other two fuel cell units may merge into the mixed gas discharge system 110 at the same time.

(E3) In the above-described embodiments, the controller 120 controls the anode gas discharge systems 60A, 60B and the cathode gas supply and discharge systems 30A, 30B via the unit controllers 20A, 20B. Alternatively, the controller 120 controls only any one of the pair of anode gas discharge systems 60A, 60B and the pair of cathode gas supply and discharge systems 30A, 30B via the unit controllers 20A, 20B to shift the time at which gas discharged from each of the fuel cell stacks 10A, 10B merges with each other in the mixed gas discharge system 110.

(E4) In the above-described embodiments, the controller 120 may further control a value that is connected to the mixed gas discharge system 110 and that discharges gas containing hydrogen. For example, in a cooling system of the fuel cell stack 10A, included in each of the fuel cell units 100A, 100B, the controller 120 is able to control a regulating valve provided in a line for, when the cooling system fails, flowing gas containing hydrogen, discharged from a reserve tank, to the cathode off-gas line 41A. The controller 120 is also able to control a regulating valve provided in a line for flowing gas containing hydrogen, discharged from the housing accommodating each of the fuel cell stacks 10A, 10B, to the cathode off-gas line 41A.

(E5) In the above-described embodiments, the controller 120 provides a valve control instruction to provide an instruction for each standby time to an associated one of the unit controllers 20A, 20B upon receiving a signal to start the discharge process, transmitted from an associated one of the unit controllers 20A, 20B. Alternatively, the controller 120 may provide a valve control instruction to the second unit controller 20B as the first unit controller 20A executes valve control (FIG. 4, step S130). The controller 120, for example, determines a standby time for the second unit controller 20B such that gas discharged from the first fuel cell unit 100A and gas discharged from the second fuel cell unit 100B merge with each other and the hydrogen concentration of gas to be discharged from the mixed gas discharge system 110 becomes lower than a predetermined value.

Figure 8:
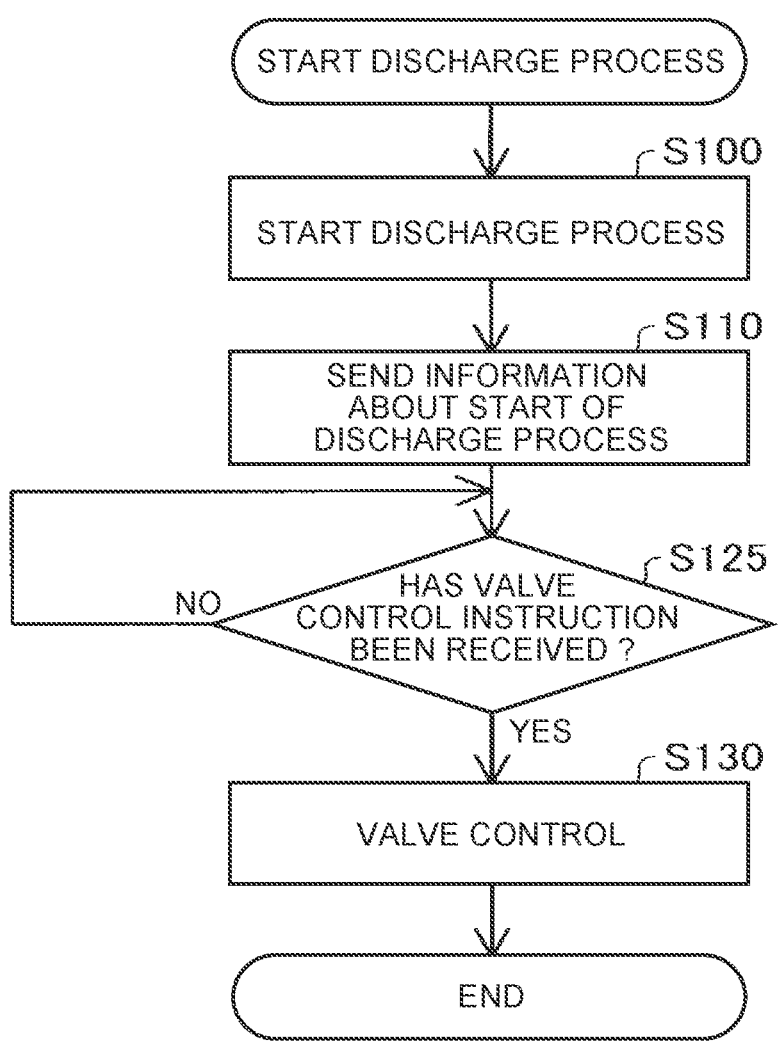
FIG. 8 is a flowchart showing an example of the procedure of a discharge process according to the embodiment.

(E6) FIG. 8 is a flowchart showing an example of the procedure of a discharge process according to the embodiment. In the first embodiment, the unit controller 20A determines in step S120 of FIG. 4 whether the standby time is longer than the predetermined threshold time. As shown in FIG. 8, the unit controller 20A may perform step S125 instead of step S120. The unit controller 20A determines in step S125 whether the valve control instruction has been received. When the valve control instruction has been received, the unit controller 20A proceeds to step S130 and executes valve control. On the other hand, when the valve control instruction has not been received, the unit controller 20A returns to step S125. In other words, the unit controller 20A repeats step S125 until the valve control instruction is received.

In other words, in the first embodiment, the controller 120 concurrently provides a valve control instruction to both the first unit controller 20A and the second unit controller 20B, and each of the first unit controller 20A and the second unit controller 20B executes valve control at a different time. Alternatively, the controller 120 may execute valve control at a different time by providing a valve control instruction to each of the first unit controller 20A and the second unit controller 20B at a different time. For example, where a point at which the hydrogen concentration of gas to be discharged from each of the fuel cell units 100A, 100B is highest is in the exhaust pipe can be determined through simulation or experiment in advance based on the volume of the cathode of each of the fuel cell stacks 10A, 10B and the volume of a line downstream of the cathode in an associated one of the fuel cell units 100A, 100B, and the flow rate of air at start-up of the fuel cell system 500. Thus, the time at which the hydrogen concentration of gas to be discharged from the first fuel cell unit 100A is highest and the time at which the hydrogen concentration of gas to be discharged from the second fuel cell unit 100B is highest can be shifted from each other.

(E7) In the third embodiment, the controller 120 calculates the hydrogen concentration of gas to be discharged from the mixed gas discharge system 110 by using the amount of electric power generated by each of the fuel cell stacks 10A, 10B, and the like. Alternatively, the fuel cell system 500 may include a hydrogen concentration sensor in each line, and the controller 120 may acquire hydrogen concentrations respectively measured by the hydrogen concentration sensors.

The disclosure is not limited to the above-described embodiments and may be implemented in various modes without departing from the purport of the disclosure. For example, the technical characteristics in the embodiments corresponding to the technical characteristics in the aspects described in SUMMARY may be replaced or combined as needed to solve the above-described inconvenience or to achieve one, some, or all of the above-described advantageous effects. When the technical characteristics not described as being indispensable in the specification may be deleted as needed.

What is claimed is:

1. A fuel cell system comprising:
    a plurality of fuel cell units each including a fuel cell stack, an anode gas discharge system configured to discharge anode gas from the fuel cell stack, and a cathode gas supply and discharge system configured to supply cathode gas to the fuel cell stack and discharge cathode gas from the fuel cell stack;
    a mixed gas discharge system configured to mix gas discharged from the anode gas discharge system and the cathode gas supply and discharge system of each of the plurality of fuel cell units and discharge the mixed gas; and
    a controller configured to control the plurality of fuel cell units, wherein the controller is configured to control at least one of the anode gas discharge system and the cathode gas supply and discharge system of each of the fuel cell units to shift a time at which gas to be discharged from each of the fuel cell units merges with each other in the mixed gas discharge system.

2. The fuel cell system according to claim 1, wherein:
    each of the anode gas discharge systems of the plurality of fuel cell units includes
        an exhaust drain valve configured to exhaust gas discharged from the fuel cell stack, and
        an exhaust pipe connecting the exhaust drain valve and the mixed gas discharge system; and
    one or some of the exhaust pipes of the plurality of fuel cell units each have a volume different from a volume of another one or some of the exhaust pipes.

3. The fuel cell system according to claim 1, wherein:
    each of the anode gas discharge systems includes an exhaust drain valve configured to exhaust gas discharged from the fuel cell stack; and the controller is configured to open one or some of the exhaust drain valves at a different time from another one or some of the exhaust drain valves by controlling the exhaust drain valves to cause gas to be discharged from the anode gas discharge systems to the mixed gas discharge system.

4. The fuel cell system according to claim 1, wherein the controller is configured to, at start-up of the fuel cell system, control each of the cathode gas supply and discharge systems to cause one or some of the cathode gas supply and discharge systems to supply cathode gas to the fuel cell stack at a time different from a time at which another one or some of the cathode gas supply and discharge systems each supply cathode gas to the fuel cell stack, and to discharge gas from an inside of the fuel cell stack.

5. A control method for a fuel cell system,
the fuel cell system including a plurality of fuel cell units each including a fuel cell stack, an anode gas discharge system configured to discharge anode gas from the fuel cell stack, and a cathode gas supply and discharge system configured to supply cathode gas to the fuel cell stack and discharge cathode gas from the fuel cell stack, and a mixed gas discharge system configured to mix gas discharged from the anode gas discharge system and the cathode gas supply and discharge system of each of the plurality of fuel cell units and discharge the mixed gas, the control method comprising:

controlling, by a controller, at least one of the anode gas discharge system and the cathode gas supply and discharge system of each of the fuel cell units to shift a time at which gas to be discharged from each of the fuel cell units merges with each other in the mixed gas discharge system.

\* \* \* \* \*